UNITED STATES PATENT OFFICE 2,542,664

COMPOSITIONS OF PHENOL-OIL CONDENSATES AND POLYEPOXIDES

Sylvan Owen Greenlee, Racine, Wis., assignor to Devoe & Raynolds Company, Inc., Louisville, Ky., a corporation of New York No Drawing. Application November 5, 1946, Serial No. 707,992

6 Claims. (Cl. 260—18)

This invention relates to new products and compositions resulting from the reaction of phenol-oil condensates with aliphatic polyepoxides in regulated proportions to give valuable compositions which are useful in the manufacture of varnishes, molded compositions and articles, etc. The invention includes initial reaction mixtures or compositions as well as intermediate and final reaction products or compositions and methods for their production and articles and products made therefrom.

The phenol-oil condensates used in making the new compositions are polyhydric phenols resulting from the condensation of two or more mols of a phenol with one mol of an unsaturated drying oil or with other unsaturated fatty acid esters of polyhydric alcohols, particularly triglyceride esters such as linseed oil, oiticica oil, tung oil, etc. When such unsaturated esters are condensed with phenols with the use of suitable condensing agents, a condensation reaction takes place with resulting attachment of the phenol to the oil through nuclear condensation at a double bond of the oil to form hydroxy aryl derivatives of the esters. Some condensation may take place between the phenolic hydroxyl group and the double bond to form ether derivatives but the main reaction is one of nuclear condensation to form polyhydric phenol derivatives of the esters which contain phenolic hydroxyl groups as their primary reactive groups and are free from functional groups other than hydroxyl groups.

The aliphatic polyepoxides used for reaction with the phenol-oil condensates in making the new compositions contain two or more epoxide groups and are free from functional groups other than epoxide groups or epoxide and hydroxyl groups. The simplest diepoxide will contain at least four carbon atoms as in the case of 1,2-epoxy-3,4 epoxy butane. The epoxy groups may be separated from each other by ether groups or linkages as in the case of bis-(2,3-epoxy propyl) ether, bis(2,3-epoxy 2-methyl propyl) ether, etc. Diepoxides or polyepoxides derived from polyhydric alcohols such as mannitol, sorbitol, erythritol or polyallyl alcohol may also be used. The polyepoxy compounds used may have varying structures and may be of complex structure so long as they do not contain groups which interfere with the desired conversion of the polyepoxide-phenol-oil condensate composition.

The polyepoxide compounds may be derived from the reaction of dichlorhydrins, epichlorhydrin or the like with other active hydrogen compounds such as mercaptans, etc. so long as there are no groups present in the final polyepoxides which interfere with the reaction of the epoxide groups with the phenol-oil condensates.

The simpler diepoxides may be produced and obtained of a high degree of purity by fractional distillation to separate them from the by-products formed during their manufacture. Thus diepoxy butane, or diglycide ether can be separated by fractional distillation and give products of high purity, for example, around 95% or higher as determined by the method of epoxide analysis hereinafter described. When polyepoxides of higher molecular weight are produced which are difficult to isolate by fractional distillation they can, nevertheless, be advantageously used, after purification to remove objectionable impurities and catalyst and without separation of the diepoxide or polyepoxides from admixed by-products such as monoepoxides, etc.

Valuable polyepoxides for use in making the new compositions can thus be obtained by the reaction of epichlorhydrin on polyhydric alcohols containing three or more hydroxyl groups. Thus, a trihydric alcohol such as glycerol or trimethylol propane can be reacted with epichlorhydrin in the proportions of 1 mol of trihydric alcohol to 3 mols of epichlorhydrin, using a catalyst which will promote the reaction of the epoxide group of the epichlorhydrin with a hydroxyl group of the alcohol and with subsequent treatment of the reaction product with a material selected from the group consisting of an alkali metal aluminate, silicate and zincate to produce a polyepoxide. Such polyepoxides may contain, for example, approximately two epoxide groups per molecule even though 3 mols of epichlorhydrin are reacted with 1 mol of a trihydric alcohol. More complex or side reactions apparently take place which result in the production of products containing free hydroxyl groups or cyclic ring compounds or polymeric compounds which may be present in the resulting product. However, such polyepoxides can nevertheless advantageously be used with phenol-oil condensates according to the present invention.

The procedure used in preparing these low molecular weight polyepoxides varies depending upon the starting material, that is, whether the starting material is a polyhydric alcohol, etc. and it also depends upon whether the epoxide contributing reactant is a dichlorhydrin, an epichlorhydrin, or a polyepoxide of a different type than the one being prepared. On the other hand, when the simple polyepoxides are prepared from polyhydric alcohols, it is often found advantageous to first react the epoxide group of the epichlorhydrin with the alcohol group present in the polyhydric alcohol in the presence of a catalyst such as boron trifluoride to produce an intermediate polychlorhydrin. This polychlorhydrin is then treated with some reagent which is capable of removing HCl to form epoxide groups.

The polyepoxide used may contain small or varying amounts of mixed monoepoxides. To the extent that monoepoxides are present they will react with the phenol-oil condensates to form hydroxy alkyl chains which in most cases contain primary alcohol groups which are reactive with epoxide groups, and may take part in crosslinking to the extent that there is a sufficient amount of polyepoxide present to react with them. In certain cases the presence of monoepoxy-hydroxy compounds may be desirable and advantageous, especially during the final hardening operation and at higher temperatures in the presence of catalysts under which conditions the hydroxyl groups readily react with the epoxide groups.

According to the present invention the phenol-oil condensates are caused to react with the polyepoxides to form new complex reaction products.

One of the objects of the invention is the production of initial reaction mixtures or compositions containing such phenol-oil condensates and polyepoxides in proportions suitable for reaction by direct addition without the formation of byproducts to form resins, films, molding compositions, etc.

Another object of the invention is the production of intermediate reaction products of phenol-oil condensates and polyepoxides which are capable of further reaction to form insoluble infusible products and the preparation of higher molecular weight and more complex compositions from such intermediate reaction products.

Another object of the invention is the production of new polyepoxy-polyhydroxy products by the reaction of phenol-oil condensates with more than the equivalent proportion of polyepoxides so that each phenolic hydroxyl group reacts with an epoxide group of a polyepoxide to form reaction products free or substantially free from phenolic hydroxyl groups but containing reactive epoxy groups.

Another object of the invention is the production of films, articles, molded products and other final reaction products from such phenol-oil condensates and polyepoxides or from intermediate reaction products thereof.

Other objects of the invention will appear from the following more detailed description.

The phenol-oil condensates used in making the new compositions and products are condensation products of phenols with unsaturated fatty acid esters of polyhydric alcohols, particularly drying oil esters. Thus, by reacting phenol with drying oils such as linseed oil, China-wood oil and oiticica oil, which contain unsaturated double bonds in the ester groups, condensation products can be produced which are hydroxy aryl or phenol derivatives of the drying oil. Where two or more mols of a monohydric phenol are thus combined per mol of drying oil the phenol-oil condensates are polyhydric phenols or polyhydric phenol-oil condensates. Such phenol-oil condensates are formed when the condensation between the phenol nucleus and the double bond of the drying oil is effected in the presence of various catalysts, such as sulfuric acid, phosphoric acid, oxalic acid, etc.

The use of a small amount of phosphoric acid is advantageous in making phenol-oil condensates with the conjugated oils. With oils of lesser unsaturation a more active catalyst is advantageously used such as zinc chloride or aluminum chloride.

The proportions of phenol and unsaturated oil reacted to form the phenol-oil condensates should in general be such that a polyhydric phenol derivative is produced, thus giving a difunctional reactant for reacting with the complex epoxides. In general, in making the phenol-oil condensates a considerable excess of the phenol is advantageously used and the excess may be more or less completely removed by vacuum distillation at the end of the condensation reaction.

According to the present invention, such phenol-oil condensates are reacted with the polyepoxides at elevated temperatures or with the aid of suitable catalysts to produce reaction and condensation products which are valuable compositions for use in the manufacture of varnishes, molding compositions, adhesives, etc. In general, the reaction between the phenol-oil condensates and polyepoxides is effected by heating the admixed materials, an elevated temperature usually being required. The use of a small amount of a catalyst such as caustic soda, or sodium phenoxides, promotes the reaction.

Initial mixtures of the phenol-oil condensates and polyepoxides can be made by mixing with heating or with the use of a solvent to give a homogeneous liquid composition. Thus, for example, the phenol-oil condensate and the polyepoxide may be separately dissolved in a common solvent and the solutions admixed. Such solutions may have a suitable catalyst added thereto to promote reaction between the phenol-oil condensate and the polyepoxide, using, e. g., sodium phenoxide or diethylene triamine as a catalyst. Such solutions may be used directly as impregnating solutions or for coating purposes with subsequent heating to convert the products into the form of the final composition.

It is one advantage of the new compositions when made from phenol-oil condensates from highly unsaturated drying oils which retain a considerable degree of unsaturation even after two or three mols of phenol have been condensed per mol of drying oil that the products still have drying properties and give resulting compositions which are oil-modified compositions and products.

While I do not desire to limit myself by any theoretical explanation of the exact nature of the reactions which take place between the polyepoxides and the phenol-oil condensates, it would appear that this reaction is primarily one of direct addition of an epoxide group to a phenolic hydroxyl group of the phenol-oil condensate with the resulting formation of an ether linkage, although reaction may also take place between an epoxide group and alcohol groups which may be present in the polyepoxides or in the initial reaction products of the polyepoxides with the phenol-oil condensates. The reaction of a phenolic hydroxyl group with an epoxide group by direct addition to form an ether linkage also results in the formation of an alcoholic hydroxyl group and such hydroxyl groups thus formed during the initial stages of the reaction may in later stages under proper conditions react with epoxide groups to form more complex reaction products. In the later stages of condensation and particularly where an excess of polyepoxide is used, and all or substantially all of the phenolic hydroxyls are caused to react, the final hardening may be due largely to reaction of remaining epoxide groups with alcoholic hydroxyl groups as well as with free phenolic hydroxyl groups which may still be present in the later stages of condensation.

The proportions of polyepoxide and of phenol-oil condensate used will vary with different condensates and polyepoxides and with the nature of the product to be produced. In general it is desirable and advantageous to use a sufficient amount of polyepoxide to react with all of the phenolic hydroxyl groups of the phenol-oil condensate or an excess of the polyepoxide.

For many purposes the initial mixture of phenol-oil condensate and polyepoxide can be used as a liquid mixture or in solution and after application converted to the final product in a single operation.

For other purposes it is advantageous to carry out the reaction of the phenol-oil condensate and polyepoxide part way to an intermediate stage of reaction such that it is capable of further reaction to form the final product; and to use the intermediate product, e. g., in solution for making films or for coating or impregnation of fabrics or other fibrous or porous material or by compounding the intermediate product with fillers, etc. to make molded products.

Instead of carrying out the reaction between the phenol-oil condensate and polyepoxide by using initially the full amounts for forming the final products, the reaction can be carried out in stages, e. g., by adding part of the polyepoxide to the full amount of the phenol-oil condensate and carrying the reaction to an intermediate stage and then mixing the intermediate reaction product with a further amount of polyepoxide before carrying out the final condensation to form the final reaction products.

It will be understood that the compositions of the present invention may be blended with other film-forming or molded-object-forming compositions. The new composition may also be pigmented or otherwise ground with certain inert fillers as desired for special applications.

Catalysts which can be used for bringing about or promoting the reaction of the polyepoxides with the phenol-oil condensates are alkaline catalysts such as aliphatic amines, sodium and potassium hydroxide and alkali phenoxides. Certain of the Friedel-Crafts type catalysts are also catalytic for these reactions. Boron trifluoride addition products or complexes which are stable or relatively stable at ordinary temperatures but which on the application of heat liberate boron trifluoride can be advantageously used. The latent type of boron trifluoride catalysts referred to are usually coordinated compounds of boron trifluoride with amines, amides, sulfides and the like. Likewise, certain diazonium salts may be prepared which contain boron trifluoride in a form which is not active at ordinary temperatures but decompose at higher temperatures to give boron trifluoride which catalyzes the polymerization or reaction through epoxide groups.

The final conversion of the composition made with the polyepoxides and phenol-oil condensates may be carried out with or without the use of solvents and with or without the use of plasticizers, depending on the final results desired.

In protective coating applications it is usually desirable to apply a product which is essentially a solid dissolved in a solvent, in which case it undergoes a preliminary drying by mere solvent evaporation, and the dry film may then be converted to an infusible, insoluble product on further heat treatment; and the compositions of the present invention are well adapted for this purpose.

On the other hand, when the compositions of the present invention are used to make molded objects, it is usually desirable to use a composition which contains no solvent, and in some cases a composition which may be used in a dry powdered form.

In still other applications, it is desirable to have a composition, containing no solvent, which is sufficiently liquid at a relatively low temperature to be used directly in the impregnation of wood and certain fabric materials.

The present invention provides a wide range of reaction compositions and products including initial mixtures of phenol-oil condensates and polyepoxides, partial or intermediate reaction products of such initial mixtures, and compositions containing such intermediate reaction products, as well as final reaction products. Compositions of an intermediate character containing unreacted epoxide groups and relatively free from unreacted phenolic hydroxyl groups may be used in reactions with other active hydrogen coupling type compounds.

In general the intermediate reaction products, unless too highly reacted or polymerized are soluble in solvents of the lacquer type such as ketone and ester solvents.

The compositions of the present invention may be used without or with fillers and extenders of the inert type. For example, valuable enamels may be obtained by pigmenting the initial or intermediate compositions with the usual type of inert pigments used in the formulation of enamels and paints. It is also sometimes desirable to use such inert materials as wood flour or asbestos with the new compositions in the preparation of certain molded objects. For example, brake linings and clutch linings may be formulated from mixtures of asbestos type materials with the new compositions.

For certain applications such as the manufacture of certain resin bonded grinding wheels it is desirable to introduce abrasive materials and other fillers into the compositions in which the resinous composition acts as a bonding material for the fillers and abrasives when the compositions are subjected to final hardening.

The invention will be further illustrated by the following specific examples but it will be understood that the invention is not limited thereto. The parts are by weight.

The first three examples illustrate the preparation of phenol-oil condensates such as are used with the polyepoxides in forming the new compositions and products.

*Example I.*—A reaction mixture of 291 parts of China-wood oil, 200 parts of phenol and 5 parts of syrupy phosphoric acid (85%) was heated with continuous agitation for three hours and 50 minutes at a temperature of 190 to 200° C. The unreacted phenol was more or less completely removed by distillation at 5 mm. pressure with heating of the mixture to 150° C. with agitation. The increase in weight indicated that approximately 3.3 mols of phenol on the average had combined or condensed with each mol of China-wood oil.

*Example II.*—A phenol-oil condensate was prepared by heating a mixture of 306 parts of oiticica oil, 250 parts of phenol and 5 parts of syrupy phosphoric acid for three hours and 50 minutes at a temperature of 186 to 200° C., followed by removal of the excess phenol by vacuum distillation. The increase in weight after removal of the excess phenol showed that approximately 2.54 mols of phenol had combined on the average with each mol of oiticica oil.

*Example III.*—A phenol-oil condensate was prepared by heating a mixture of 727 parts of China-wood oil, 600 parts of phenol and 13.5 parts of syrupy phosphoric acid with agitation for three hours at a temperature of 180 to 200° C., followed by removal of the excess phenol by vacuum distillation.

The increase in weight after removal of the excess phenol showed that approximately 5.16 mols of phenol had combined on the average with each mol of China-wood oil.

Examples IV and V illustrate the preparation of special polyepoxides from epichlorhydrin and trihydric alcohols which are suitable for use with phenol-oil condensates in making the new compositions.

*Example IV.*—In a reaction vessel provided with mechanical stirrer and external cooling means was placed 276 parts (3 mols) of glycerol and 828 parts (9 mols) of epichlorhydrin. To this reaction mixture was added 1 part of 45% boron trifluoride ether solution diluted with 9 parts of ether. The reaction mixture was agitated continuously. The temperature rose to 50° C. over a period of 1 hour and 44 minutes at which time external cooling with ice water was applied. The temperature was held between 49° C. and 77° C. for 1 hour and 21 minutes.

To 370 parts of this product in a reaction vessel provided with a mechanical agitator and a reflux condenser was added 900 parts of dioxane and 300 parts of powdered sodium alum'nate. With continuous agitation this reaction mixture was gradually heated to 93° C. over a period of 1 hour and 51 minutes and held at this temperature for 8 hours and 49 minutes. After cooling to room temperature the inorganic material was removed by filtration. The dioxane and low boiling products were removed by heat'ng the filtrate to 205° C. at 20 mm. pressure to give 261 parts of a pale yellow product.

This product can be distilled at temperatures above 200° C. at 2 mm. pressure provided it is sufficiently freed from impurities but unless care is taken it is liable to undergo a vio'ent exothermic reaction. It is not, however, necessary to purify this product by distillation since such by-products as are present do not interfere with the use of the product as a polyepoxide.

The epoxide equivalent of this product was determined by titrating a one gram sample with an excess of pyridine containing pyridine hydrochloride (made by adding 16 cc. of concentrated hydrochloric acid per liter of pyridine) at the boiling point for 20 minutes and back titrating the excess pyridine hydrochloride with 0.1 N sodium hydroxide using phenolphthalein as indicator, and considering 1 HCl is equivalent to one epoxide group.

The epoxide equivalent represents the equivalent weight of the product per epoxide group. The epoxide equivalent so determined was 149. The molecular weight as determined by a standard boiling point elevation method was 324. Th's represents an average of 2.175 epoxide groups per molecule, assuming the determined molecular weight is the molecular weight. It is probable that the molecular weight is an average molecular weight of a product containing more than one reaction product. The average molecular weight is higher than that which would correspond to a product made up solely of the reaction product of 1 mol of glycerol with 3 mols of epichlorhydrin and it seems probable that complex reaction products are also formed, some of which may be of a polymeric or cross-linked nature. The product is, however, a valuable product for use as a polyepoxide in making the new compositions.

*Example V.*—By a procedure similar to that described in Example IV, 1 mol of trimethylol propane and 3 mols of epichlorhydrin were condensed with boron trifluoride and finally treated with sodium aluminate to give 299 parts of a pale yellow liquid. The product had an equivalent weight to epoxide of 151 and an average molecular weight of 292.2.

This corresponds to approximately 1.94 epoxide groups per mo.ecule, assuming an average molecular weight.

The product of this example can also be distilled at high temperatures and low pressures to give a water white liquid, but such further purification is not necessary and the product obtained can be directly used in making the new compositions. Or the purified product can be produced and s'milarly used.

The following examples illustrate the new compositions made from phenol-oil condensates and po.yepoxides.

*Example VI.*—A 50% solution in methyl ethyl ketone was made of 1660 parts of the phenol-oil condensate of Example I and 160 parts of diglycide ether and to the resulting solution was added 9 parts of diethylene tr'amine. When the resulting varnish was spread as a wet film of .003 inch thickness and the film dr'ed and baked for 45 minutes at 150° C. it gave a hard, tough, flexible product.

*Example VII.*—A similar so'ution was made in the form of a 50% solution in methyl ethyl ketone of 1660 parts of the phenol-oil condensate of Example I and 320 parts of diglycid ether and to the resulting solution was added 16 parts of diethylene triamine. When the resulting varn'sh was similarly spread as a fi'm and baked for 45 minutes at 150° C. it gave a hard, tough, flexible product.

*Example VIII.*—A 50% solution in methyl ethyl ketone was made of 1660 parts of the phenol-oil condensate of Example III and 350 parts of the polyepoxide of Example V and 17½ parts of diethylene triamine was added to the resulting solution. When the resulting varnish was spread in the form of wet films of .003 inch thickness and baked for 15 minutes at 150° C. it gave a hard, tough, flexible product.

*Example IX.*—Two hundred parts of the phenol-oil condensate of Example I and 180 parts of the polyepoxide of Example IV were heated at 100–120° C. for 1 hour. The composition so obtained was thinned to a 50% so'ution with methyl ethyl ketone. Nine (9) parts of diethylene triamine were added to the resulting solution. When this solution was spread as a varnish film of .003 inch thickness and baked for 10 minutes at 250° C. it gave a hard, tough, flexible product.

*Example X.*—A 50% solution of methyl ethyl ketone was similarly made of 1660 parts of the phenol-oil condensate of Example II and 350 parts of the polyepoxide of Example V and to this solution was added 10 parts of diethylene triamine. When the resulting solution was spread as a varnish film of .003 inch thickness and baked for 10 minutes at 200° C. it gave a hard, tough, flexible product.

Products and compositions of varying properties can be produced by using varying proportions of the phenol-oil condensates and of the polyepoxides or by using different condensates and polyepoxides.

The new compositions are capable of admixture with various resins both natural and synthetic to form the final molding mixtures or compositions and can also be used for compounding with fillers in making molded articles or for impregnating paper, fabric, wood, etc. in making impregnated or coated or laminated articles.

It will thus be seen that the present invention provides new compositions and products in which phenol-oil condensates are admixed with polyepoxides to form initial compositions capable of conversion into intermediate or into final reaction or polymerization products.

It will also be seen that the initial compositions of polyepoxides and phenol-oil condensates may be used directly in making liquid coating compositions or in making molded articles, etc. with subsequent conversion by heating into the final reaction products.

It will further be seen that intermediate reaction products can be produced which are soluble and which are capable of further reaction to form the final insoluble products.

It will also be seen that the reaction between the polyepoxide and the phenol-oil condensate, which is mainly or primarily one of direct reaction by addition of epoxide to hydroxyl groups does not give off any by-products but results in joining the reactants together through ether linkages with the polyepoxides capable of acting as cross-linking reactants with the phenol-oil condensates while unreacted epoxide groups present at an intermediate or later stage of reaction may further react with hydroxyl groups to form more complex final reaction products.

Compositions made with and from phenol-oil condensates and complex epoxides, including complex polyepoxides, are described and claimed in my companion application Serial No. 707,991, now U. S. Patent 2,502,145.

I claim:

1. The method of producing drying compositions which comprises reacting (1) phenol oil condensates resulting from the condensation of a monohydric phenol and a vegetable drying oil in the proportions of at least 2 mols of phenol to 1 mol of drying oil, and said condensate containing at least 2 phenolic hydroxyl groups and being free from functional groups other than hydroxyl groups and having drying properties and (2) an aliphatic polyepoxide containing at least 2 epoxide groups and being free from aromatic groups and from functional groups other than epoxide and hydroxyl groups, in the proportions of from about 18 parts of polyepoxide to 20 parts of phenol oil condensate to about 16 parts of polyepoxides to 166 parts of phenol oil condensate, said reaction being carried out wth heating and in the presence of a catalyst selected from the group which consists of alkaline catalysts and Friedel-Crafts catalysts.

2. A reaction product resulting from the method of claim 1.

3. A drying composition in the form of a reaction mixture of (1) phenol oil condensates resulting from the condensation of a monohydric phenol and a vegetable drying oil in the proportions of at least 2 mols of phenol to 1 mol of drying oil, and said condensate containing at least 2 phenolic hydroxyl groups and being free from functional groups other than hydroxyl groups and having drying properties and (2) an aliphatic polyepoxide containing at least 2 epoxide groups and being free from aromatic groups and from functional groups other than epoxide and hydroxyl groups, in the proportions of from about 18 parts of polyepoxide to 20 parts of phenol oil condensate to about 16 parts of polyepoxide to 166 parts of phenol oil condensate.

4. A drying composition as defined in claim 3 in which the reaction mixture is dissolved in a volatile organic solvent with a small amount of a catalyst selected from the group which consists of alkaline catalysts and Friedel-Crafts catalysts.

5. A drying composition as defined in claim 3 in which the polyepoxide is obtained by reaction of glycerol with epichlorhydrin followed by reaction of said epichlorhydrin reaction product with an alkaline material selected from the group which consists of an alkali metal aluminate, silicate and zincate.

6. A reaction mixture as defined in claim 3 in which the phenol oil condensate is a condensate of phenol and China-wood oil.

SYLVAN OWEN GREENLEE.

REFERENCES CITED

The following references are of record in the file of this patent:

UNITED STATES PATENTS

| Number | Name | Date |
| --- | --- | --- |
| 1,887,833 | Byck | Nov. 15, 1932 |
| 2,059,260 | Long et al. | Nov. 3, 1936 |
| 2,131,120 | Schlack | Sept. 27, 1938 |

FOREIGN PATENTS

| Number | Country | Date |
| --- | --- | --- |
| 579,698 | Great Britain | Aug. 13, 1946 |